United States Patent
Jiang et al.

(10) Patent No.: US 9,649,770 B1
(45) Date of Patent: May 16, 2017

(54) MAGNETIC HOLDING DEVICE WITH MOVABLE MAGNETIC SHIELDING DEVICE

(71) Applicant: Hiwin Technologies Corp., Taichung (TW)

(72) Inventors: Zong Sian Jiang, Taichung (TW); Wuteng Hsieh, Taichung (TW); Peiling Chung, Taichung (TW)

(73) Assignee: Hiwin Technologies Corp., Situn, Taichung (TW)

( * ) Notice: Subject to any disclaimer, the term of this patent is extended or adjusted under 35 U.S.C. 154(b) by 0 days.

(21) Appl. No.: 15/082,157

(22) Filed: Mar. 28, 2016

(51) Int. Cl.
  *H01F 7/20* (2006.01)
  *B25J 15/06* (2006.01)
  *H01F 7/02* (2006.01)

(52) U.S. Cl.
  CPC ............ *B25J 15/0608* (2013.01); *H01F 7/02* (2013.01)

(58) Field of Classification Search
  CPC ........ H01F 7/02; H01F 7/0252; H01F 7/0257; B25J 15/0608; B23Q 3/1546; B25B 11/002
  See application file for complete search history.

(56) References Cited

U.S. PATENT DOCUMENTS

| | | | |
|---|---|---|---|
| 3,818,399 A * | 6/1974 | Edwards | B23Q 3/1546 335/295 |
| 4,504,088 A | 3/1985 | Carter | |
| 4,542,890 A * | 9/1985 | Braillon | B23Q 3/1546 269/8 |
| 5,409,347 A | 4/1995 | Suzuki | |
| 5,428,331 A | 6/1995 | Graner et al. | |
| 5,845,950 A | 12/1998 | Stowe et al. | |
| 6,086,125 A | 7/2000 | Kovacs et al. | |
| 6,168,221 B1 | 1/2001 | Carruth et al. | |
| 6,538,544 B1 | 3/2003 | Hardy | |
| 6,707,360 B2 * | 3/2004 | Underwood | B23Q 3/1546 269/8 |

* cited by examiner

*Primary Examiner* — Bernard Rojas
(74) *Attorney, Agent, or Firm* — Charles E. Baxley

(57) ABSTRACT

A magnetic holding device includes a receptacle having a chamber formed by an upper fence and a bottom portion, an attracting device supported in the receptacle and spaced from the bottom portion of the receptacle for forming a space between the bottom portion of the receptacle and the attracting device, and a shielding device includes a non-shielding element and a magnetic shielding member, the attracting device is capable of attracting a work piece when the non-shielding element is located below the attracting device, and the attracting device is shielded and prevented from attracting the work piece when the magnetic shielding member is located below the attracting device.

6 Claims, 9 Drawing Sheets

MAGNETIC HOLDING DEVICE WITH MOVABLE MAGNETIC SHIELDING DEVICE

BACKGROUND OF THE INVENTION

1. Field of the Invention

The present invention relates to a magnetic holding device, and more particularly to a magnetic holding device including an improved structure having a compact configuration that may be made or manufactured with a simplified making or manufacturing procedure and that maybe made or manufactured with a reduced manufacturing cost.

2. Description of the Prior Art

Various kinds of typical magnetic holding devices or carriers have been developed and provided for magnetically attracting or acting with work pieces and for lifting and/or moving the work pieces in a working factory or the like, and normally, the typical magnetic holding devices or carriers comprise a magnetic member or element for attracting or acting with the work pieces that are made of magnetic attractive materials.

For example, U.S. Pat. No. 4,504,088 to Carter, U.S. Pat. No. 5,409,347 to Suzuki, U.S. Pat. No. 5,428,331 to Graner et al., U.S. Pat. No. 5,845,950 to Stowe et al., U.S. Pat. No. 6,086,125 to Kovacs et al., U.S. Pat. No. 6,168,221 to Carruth et al., and U.S. Pat. No. 6,538,544 to Hardy disclose several of the typical magnetic holding devices or carriers each also comprise a magnetic member or element for attracting or acting with the work pieces that are made of magnetic attractive materials, and normally comprise an outer container or receptacle for slidably receiving or engaging with the magnetic attractive members or elements.

However, the outer containers or receptacles of the typical magnetic holding devices or carriers comprise a large volume having a vertical guiding passage or elements formed or provided therein and arranged for allowing the magnetic attractive members or elements to be moved up and down relative to the outer containers or receptacles, such that the outer containers or receptacles of the typical magnetic holding devices or carriers may include a great height and/or volume that is adverse for storing and transportation purposes.

The present invention has arisen to mitigate and/or obviate the afore-described disadvantages of the conventional magnetic holding devices.

SUMMARY OF THE INVENTION

The primary objective of the present invention is to provide a magnetic holding device including an improved structure having a compact configuration that may be made or manufactured with a simplified making or manufacturing procedure and that maybe made or manufactured with a reduced manufacturing cost.

In accordance with one aspect of the invention, there is provided a magnetic holding device comprising a receptacle including a chamber formed therein and defined by an outer peripheral fence, an upper fence, and a bottom portion, an attracting device supported in the chamber of the receptacle and spaced or separated from the bottom portion of the receptacle for forming a space between the bottom portion of the receptacle and the attracting device, and a shielding device including a non-shielding element and a magnetic shielding member provided thereon and slidable and moveable through the space that is formed between the bottom portion of the receptacle and the attracting device, and the attracting device is capable of attracting a work piece when the non-shielding element of the shielding device is located between the bottom portion of the receptacle and the attracting device, and the attracting device is shielded and prevented from attracting the work piece when the magnetic shielding member of the shielding device is located between the bottom portion of the receptacle and the attracting device. The attracting device is not required to be moved up and down relative to the receptacle such that the receptacle or the magnetic holding device may be formed into a reduced height and/or volume that is excellent for storing and transportation purposes.

The receptacle includes a platform supported in the chamber of the receptacle, and the attracting device is attached to a bottom portion of the platform and located above the bottom portion of the receptacle. The receptacle includes a number of posts mounted in the chamber of the receptacle for supporting the platform and the other parts or elements.

The receptacle includes a driving device supported in the chamber or the platform of the receptacle and coupled to the shielding device for moving the shielding device through the space that is formed between the bottom portion of the receptacle and the attracting device moving the non-shielding element and the magnetic shielding member of shielding device relative to the receptacle and the attracting device.

The driving device includes a first pulley, and the receptacle includes a first spindle rotatably supported in the chamber of the receptacle and engaged with the shielding device, a second pulley attached to the first spindle and rotated in concert with the first spindle, and the second pulley is connected to the first pulley with a coupling device for allowing the first spindle to be rotated and driven relative to the receptacle by the driving device and for allowing the shielding device to be wound onto the first spindle and to be released from the first spindle selectively.

The receptacle includes a second spindle rotatably supported in the chamber of the receptacle and engaged with the shielding device for allowing the shielding device to be wound onto the second spindle for allowing the second spindle and the shielding device to be moved relative to the receptacle by the driving device and the first spindle.

The receptacle includes a spring biasing member engaged between the second spindle and the receptacle for winding the shielding device onto the second spindle and for moving the shielding device relative to the attracting device. The receptacle includes at least one roller supported in the chamber of the receptacle and engaged with the shielding device for tightening the shielding device.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
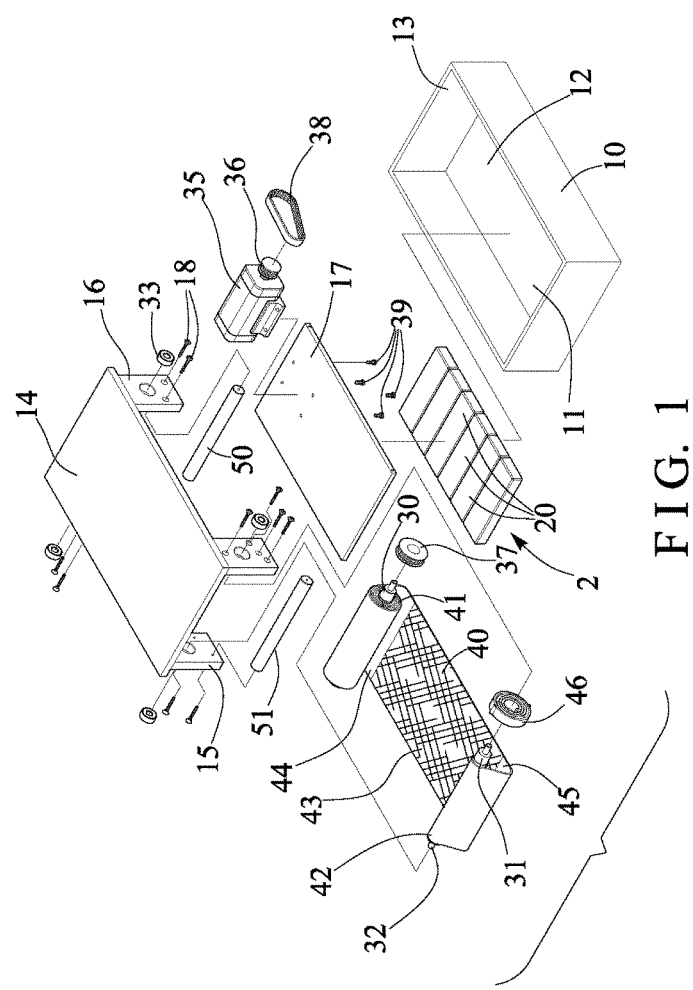
FIG. 1 is a partial exploded view of a magnetic holding device in accordance with the present invention.
Figure 2:
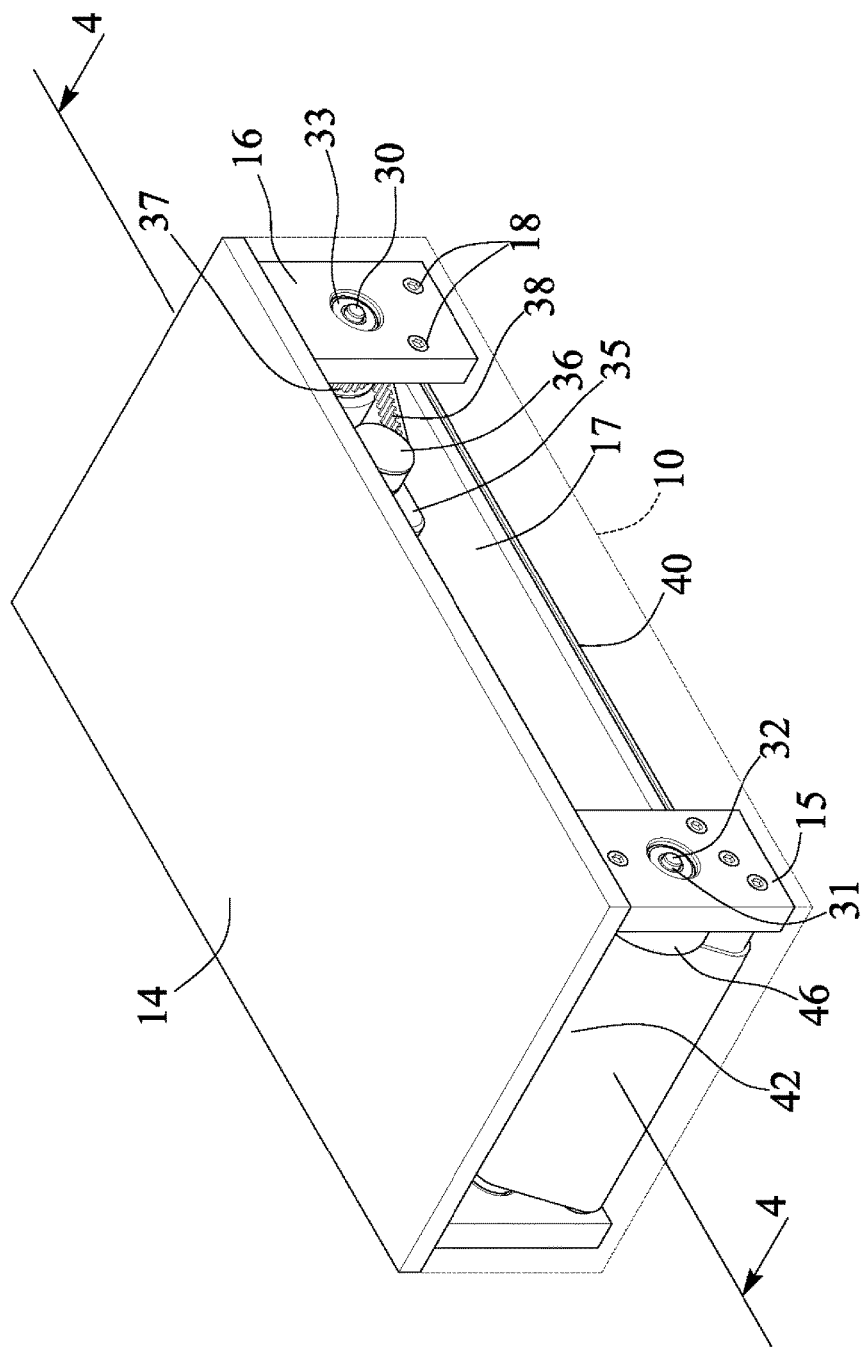
FIG. 2 is an upper perspective view of the magnetic holding device, in which a portion of the outer housing or receptacle has been removed or shown in dotted lines for showing the inner structure of the magnetic holding device.

Referring to the drawings, and initially to FIGS. 1-4, a magnetic holding device in accordance with the present invention comprises an outer housing or receptacle 10 including a compartment or chamber 11 formed therein and formed or defined by a lower or bottom wall or portion 12, and/or an outer peripheral wall or fence 13, and/or an upper wall or fence 14, and including one or more (such as four), or two pairs of studs or posts 15, 16 attached or mounted or secured to the upper fence 14 and/or engaged between the upper fence 14 and the bottom portion 12 of the receptacle 10, and a partition or platform 17 disposed or engaged into the chamber 11 of the receptacle 10 and attached or mounted or secured to the posts 15, 16 with screws or latches or fasteners 18 or the like, and offset or spaced or separated from the upper fence 14 and the bottom portion 12 of the receptacle 10, and/or the platform 17 is supported or engaged between the upper fence 14 and the bottom portion 12 of the receptacle 10.

Figure 3:
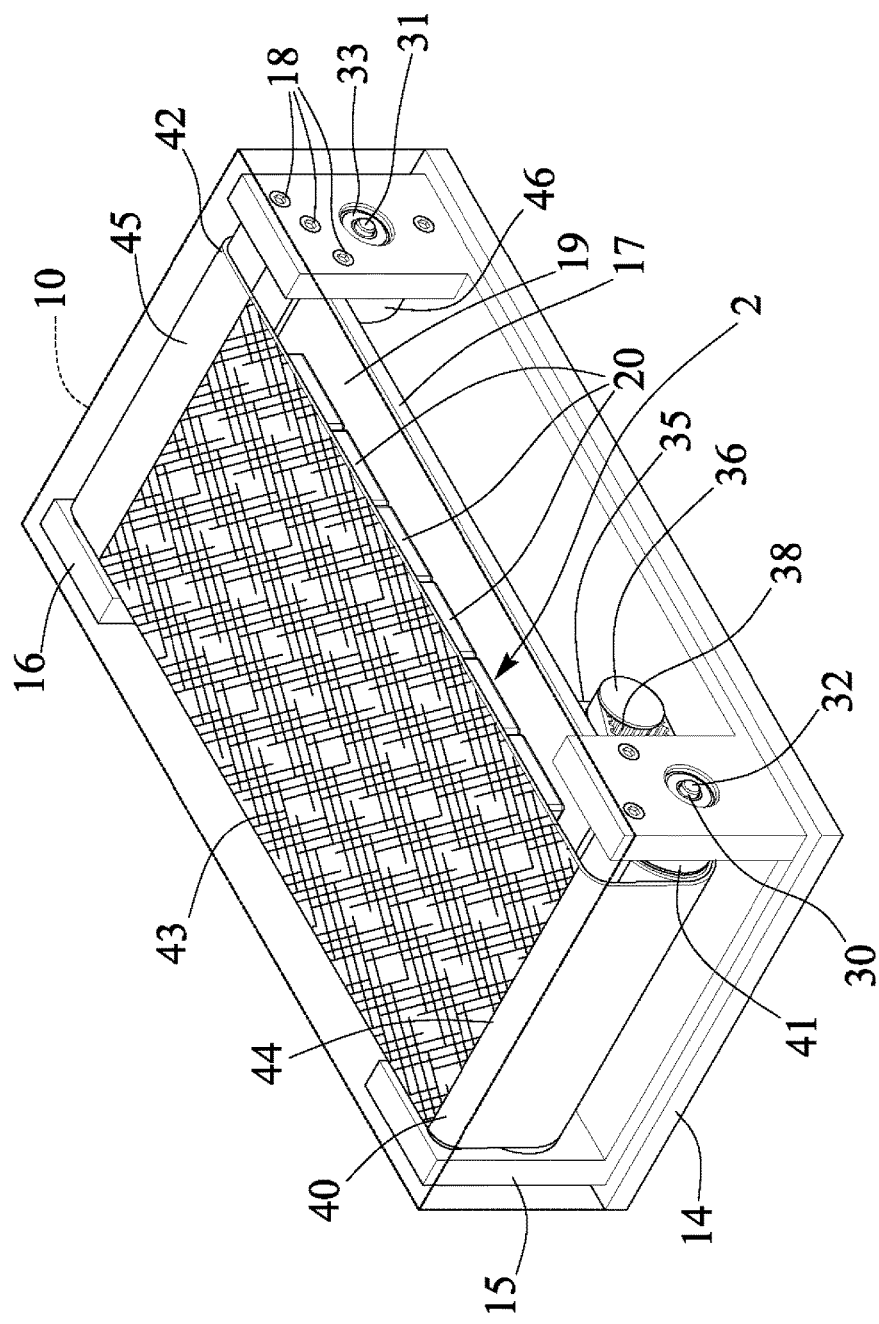
FIG. 3 is a bottom perspective view of the magnetic holding device, in which a portion of the outer housing or receptacle has been removed or shown in dotted lines for showing the inner structure of the magnetic holding device.
Figure 4:
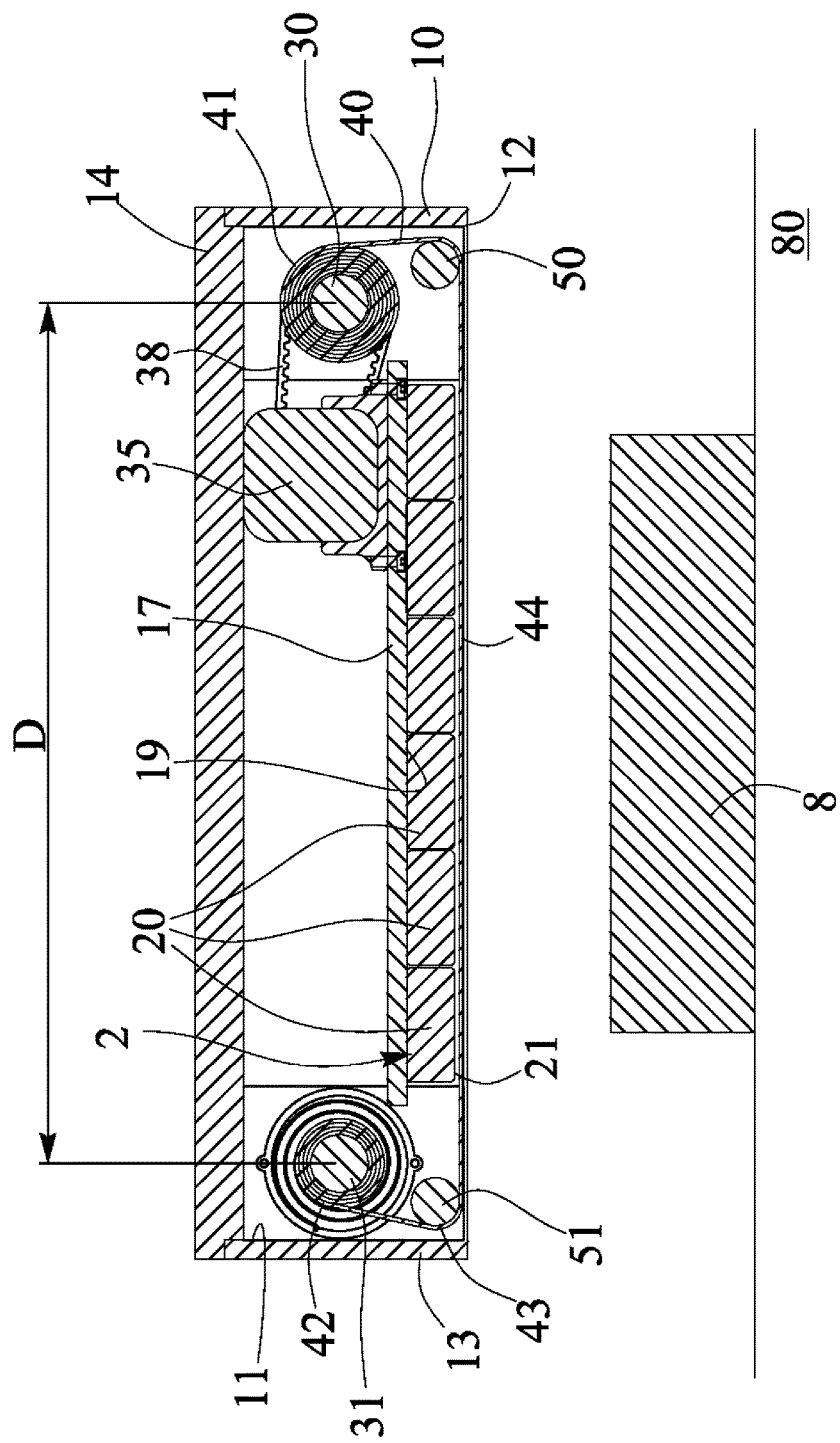
FIG. 4 is a cross sectional view of the magnetic holding device, taken along lines 4-4 of FIG. 2.
Figure 5:
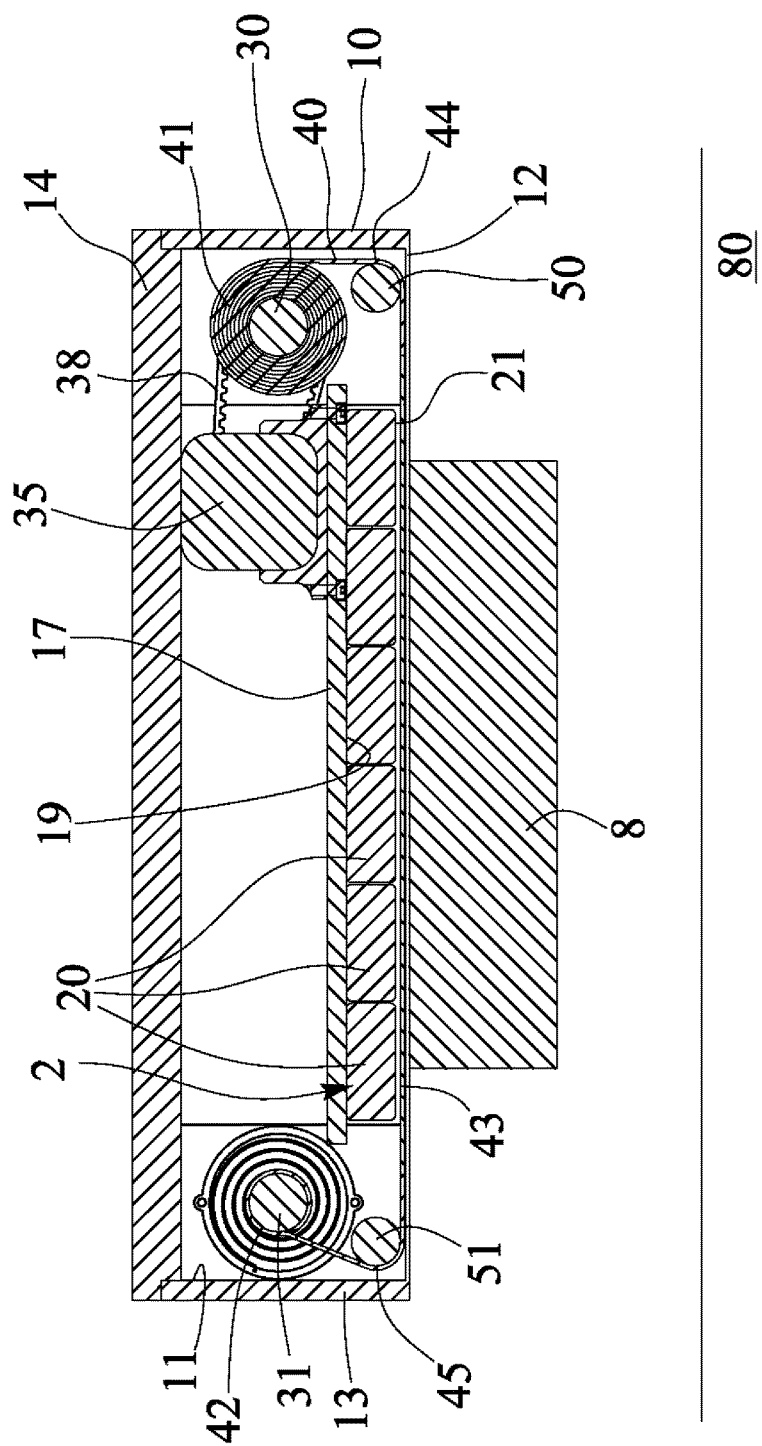
FIG. 5 is another cross sectional view similar to FIG. 4, illustrating the operation of the magnetic holding device.

An acting or attracting device 2 includes one or more (such as six) magnetic elements or members 20 supported in the chamber 11 of the receptacle 10, and attached or mounted or secured to the lower or bottom portion 19 of the platform 17 (FIGS. 3, 4) and offset or spaced or separated from the bottom portion 12 of the receptacle 10 for forming or defining a gap or space 21 between the bottom portion 12 of the receptacle 10 and the magnetic members 20 (FIGS. 4-5). One or more (such as two) spindles 30, 31 are pivotally or rotatably attached or mounted or secured to the posts 15, 16, such as secured between the pairs of posts 15, 16 respectively and parallel to each other, for example, the end portions 32 of the spindles 30, 31 are attached to the posts 15, 16 with bearing members 33 for allowing the spindles 30, 31 to be smoothly pivoted or rotated relative to the receptacle 10. It is preferable that the spindles 30, 31 are spaced or separated from each other for a predetermined length or distance (D, FIG. 4).

The bottom portion 12 of the receptacle 10 may include an opening 12 formed therein for allowing the magnetic members 20 to be faced and directed toward the work piece 8; or the bottom portion 12 of the receptacle 10 may be selected from a wall or fence 12 that includes a thickness for allowing the magnetic members 20 to act with the work piece 8. A power rotating or driving device 35, such as a motor, a hydraulic or pneumatic driving device 35 is attached or mounted or secured on the platform 17 with screws or latches or fasteners 39 or the like, and the power driving device 35 includes a gear or pulley 36 attached or coupled thereto. Another gear or pulley 37 is attached or mounted or secured to one of the spindles or the first spindle 30 and rotated in concert with the spindle 30, and connected or coupled to the pulley 36 of the power driving device 35 with a coupling or connecting device 38, such as a connecting chain, strap, belt 38 or the like for allowing the first spindle 30 to be coupled to and pivoted or rotated or driven relative to the receptacle 10 with or by the power driving device 35.

A covering or shielding device 40, such as a shielding belt or strap or member 40 slidably received or engaged in the space 21 that is formed or provided between the bottom portion 12 of the receptacle 10 and the magnetic members 20, and the shielding device 40 includes two end portions 41, 42 attached or mounted or secured to and engaged with or coiled or wound around the spindles 30, 31 respectively for allowing the shielding device 40 to be selectively engaged or coiled or wound around the first spindle 30 with or by the power driving device 35. The shielding device 40 includes one or more non-shielding segments or elements 43 and one or more magnetic shielding segments or members 44, 45 formed or provided thereon (FIGS. 1, 3) for selectively and slidably engaged or moved through the space 21 that is formed or provided between the bottom portion 12 of the receptacle 10 and the magnetic members 20.

For example, as shown in FIGS. 3 and 5, when either of the non-shielding elements 43 of the shielding device 40 is moved to the space 21 that is formed between the bottom portion 12 of the receptacle 10 and the magnetic members 20, the magnetic members 20 have not been shielded or blocked and may act and attract the work piece 8 for allowing the work piece 8 to be acted or attracted by the magnetic members 20 selectively (FIG. 5). On the contrary, when either of the magnetic shielding members 44, 45 of the shielding device 40 is moved to the space 21 that is formed between the bottom portion 12 of the receptacle 10 and the magnetic members 20, the magnetic members 20 are shielded or blocked by either of the magnetic shielding members 44, 45 of the shielding device 40 and may not act or attract the work piece 8 at this moment, for preventing the work piece 8 from being acted or attracted by the magnetic members 20 (FIG. 4).

Either of the non-shielding elements 43 or the magnetic shielding members 44, 45 of the shielding device 40 may be moved to the space 21 that is formed between the bottom portion 12 of the receptacle 10 and the magnetic members 20 with or by the power driving device 35 selectively, to align either of the non-shielding elements 43 or the magnetic shielding members 44, 45 of the shielding device 40 with the magnetic members 20 when the first end portion 41 of the shielding device 40 is wound onto and around the first spindle 30 with or by the power driving device 35, for example. A spring biasing member 46, such as a coil spring 46 is attached or mounted or secured to and engaged with or between the second spindle 31 and the posts 15, 16 or the receptacle 10 for applying a spring biasing force onto or against the second spindle 31 and for recovering and winding the second end portion 42 of the shielding device 40 onto and around the second spindle 31, and for moving either of the non-shielding elements 43 or the magnetic shielding members 44, 45 of the shielding device 40 away from the magnetic members 20.

It is to be noted that the non-shielding elements 43 of the shielding device 40 are preferably made of non-magnetic attractive materials for allowing the work piece 8 that is supported or engaged on the working or supporting surface 80 to be acted or attracted by the magnetic members 20 selectively (FIG. 5); and the magnetic shielding members 44, 45 of the shielding device 40 are preferably made of magnetic attractive materials for attracting or acting with the magnetic members 20 and for preventing the work piece 8 that is supported or engaged on the working or supporting surface 80 from being acted or attracted by the magnetic members 20 (FIG. 4). As shown in FIGS. 1 and 4-5, one or more (such as two) rollers 50, 51 may further be provided and attached or mounted or secured to the posts 15, 16 or the receptacle 10 for engaging with the shielding device 40 and for straightening or tightening the shielding device 40.

Figure 6:
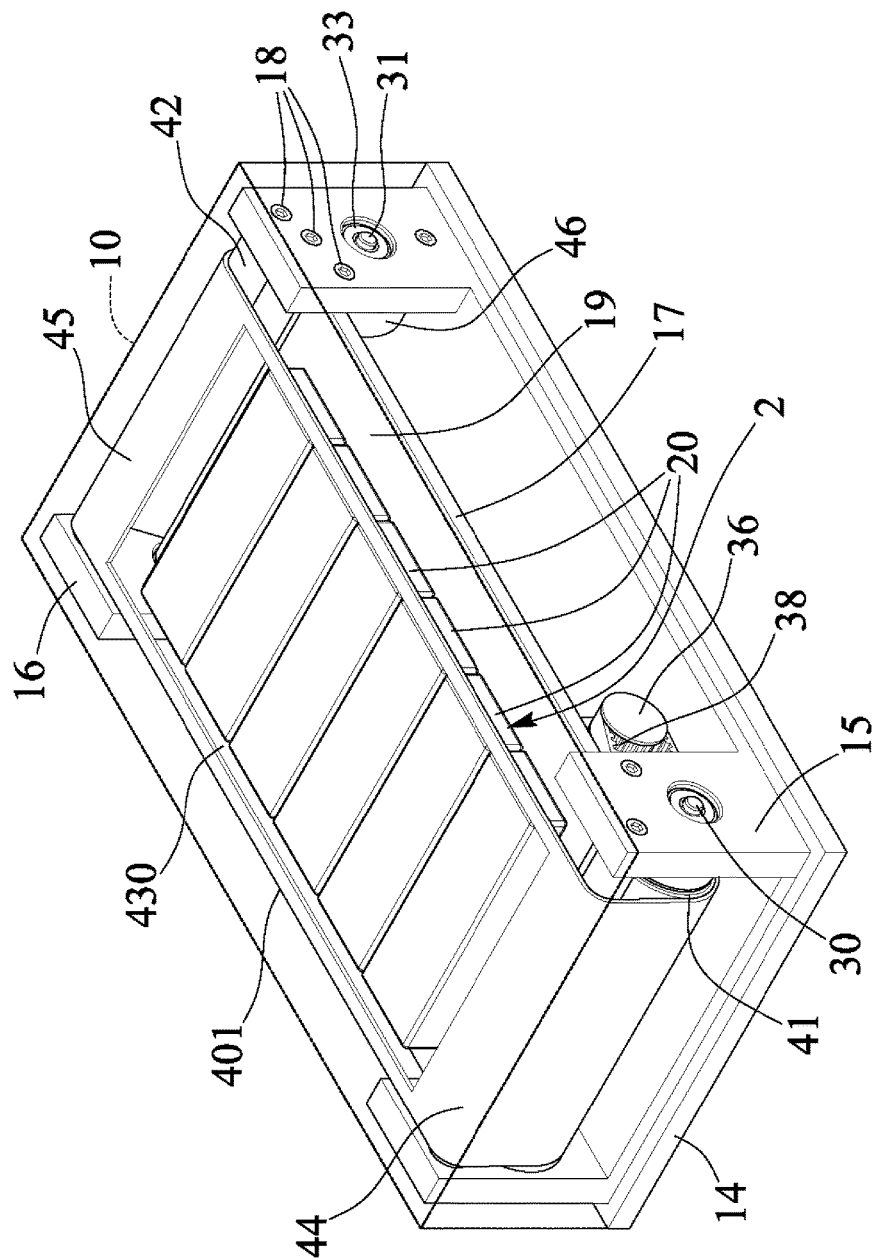
FIG. 6 is another bottom perspective view similar to FIG. 3, illustrating the other arrangement or application of the magnetic holding device.
Figure 7:
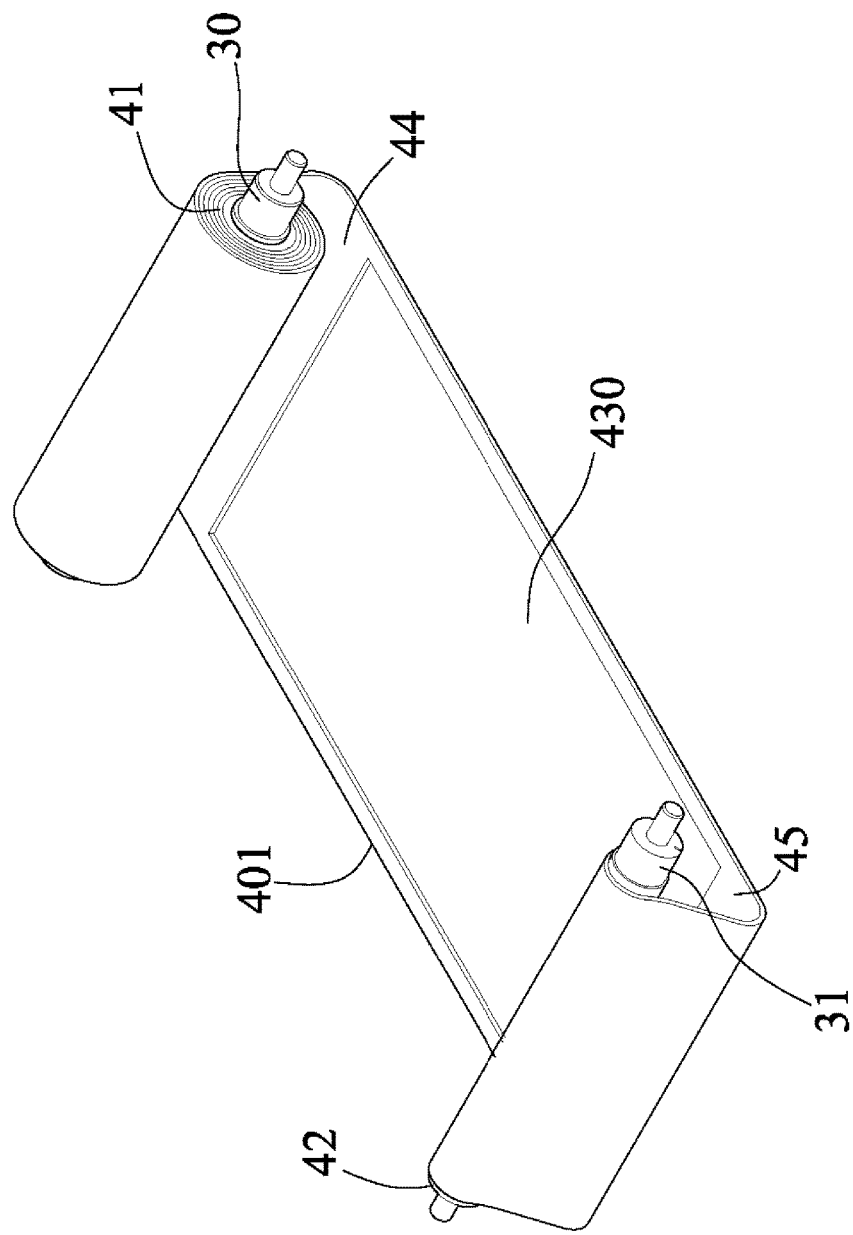
FIG. 7 is a partial perspective view illustrating a shielding device of the magnetic holding device as shown in FIG. 6.
Figure 8:
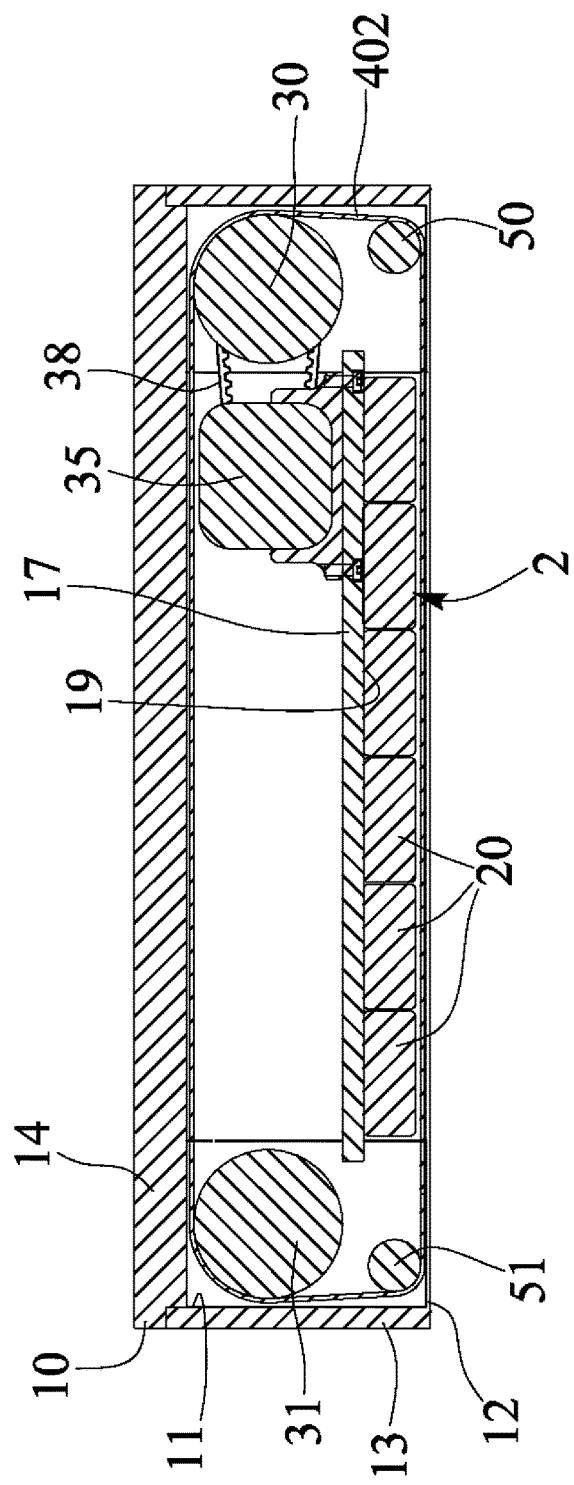
FIG. 8 is a further cross sectional view similar to FIGS. 4 and 5, illustrating the further arrangement or application of the magnetic holding device.
Figure 9:
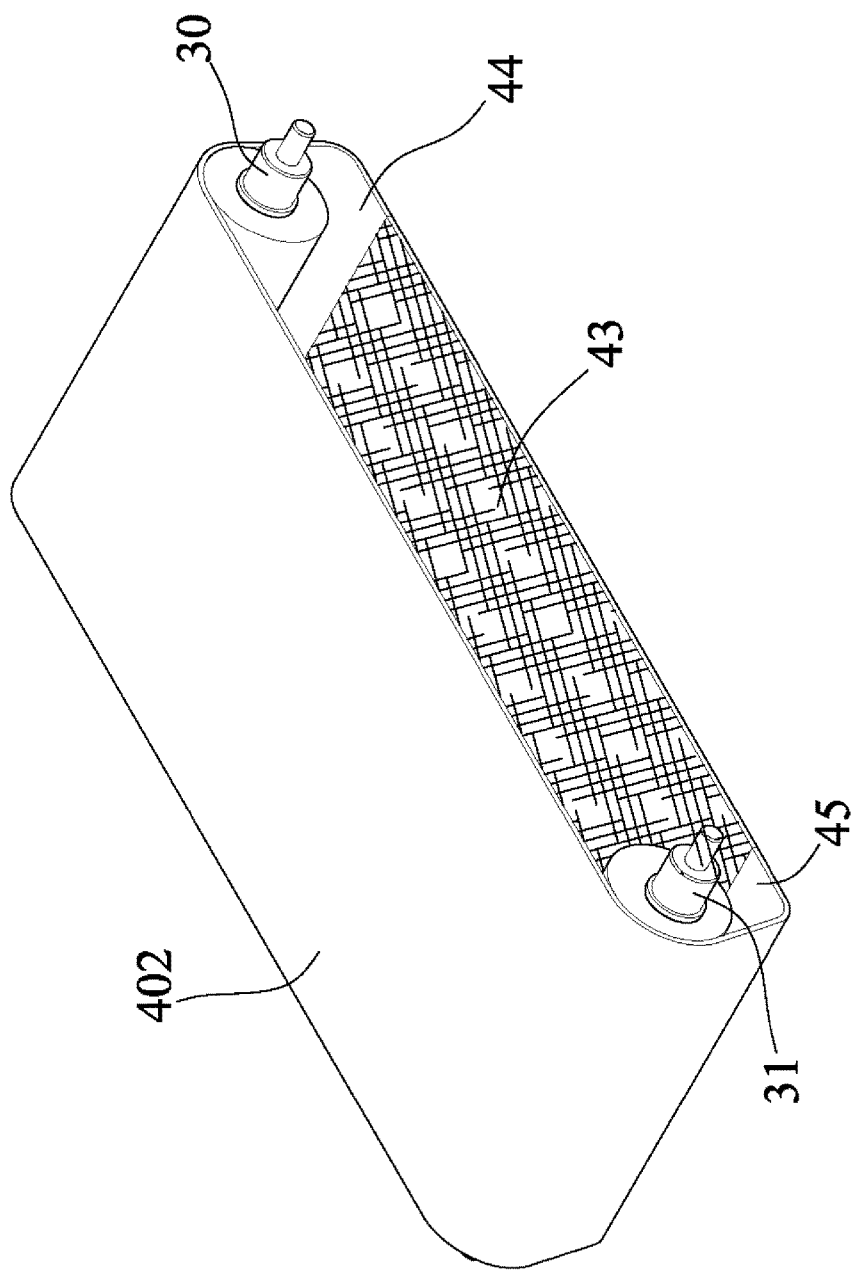
FIG. 9 is a partial perspective view illustrating a shielding device of the magnetic holding device as shown in FIG. 8.

Alternatively, as shown in FIGS. 6 and 7, the non-shielding elements 430 of the shielding device 401 may be selected from an opening 430 formed in the shielding device 401 for allowing the magnetic members 20 to be faced and directed toward the work piece 8 without being shielded or blocked. Further alternatively, as shown in FIGS. 8 and 9, the shielding device 402 may include an endless or circular structure for allowing the shielding device 402 to be moved around the spindles 30, 31 continuously. It is to be noted that the magnetic members 20 are not required to be moved up and down relative to the outer receptacle 10 such that the outer receptacle 10 of the magnetic holding device may be formed into a greatly reduced height and/or volume that is excellent for storing and transportation purposes.

Accordingly, the magnetic holding device in accordance with the present invention includes an improved structure having a compact configuration that may be made or manufactured with a simplified making or manufacturing procedure and that maybe made or manufactured with a reduced manufacturing cost.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. A magnetic holding device comprising:
   a receptacle including a chamber formed therein and defined by an outer peripheral fence, an upper fence, and a bottom portion,
   an attracting device supported in said chamber of said receptacle and spaced from said bottom portion of said receptacle for forming a space between said bottom portion of said receptacle and said attracting device,
   a shielding device including a non-shielding element and a magnetic shielding member provided thereon and slidable and moveable through the space that is formed between said bottom portion of said receptacle and said attracting device,
   a driving device supported in said chamber of said receptacle and coupled to said shielding device for moving said shielding device through the space that is formed between said bottom portion of said receptacle and said attracting device, said driving device including a first pulley,
   said receptacle including a first spindle rotatably supported in said chamber of said receptacle and engaged with said shielding device, and
   said driving device including a second pulley attached to said first spindle and rotated in concert with said first spindle, and said second pulley being connected to said first pulley with a coupling device for allowing said first spindle to be rotated and driven relative to said receptacle by said driving device, and
   said attracting device being capable of attracting a work piece when said non-shielding element of said shielding device is located between said bottom portion of said receptacle and said attracting device, and said attracting device being shielded and prevented from attracting said work piece when said magnetic shielding member of said shielding device is located between said bottom portion of said receptacle and said attracting device.

2. The magnetic holding device as claimed in claim 1, wherein said receptacle includes a platform supported in said chamber of said receptacle, and said attracting device is attached to a bottom portion of said platform.

3. The magnetic holding device as claimed in claim 2, wherein said receptacle includes a plurality of posts mounted in said chamber of said receptacle for supporting said platform.

4. The magnetic holding device as claimed in claim 1, wherein said receptacle includes a second spindle rotatably supported in said chamber of said receptacle and engaged with said shielding device for allowing said shielding device to be wound onto said second spindle.

5. The magnetic holding device as claimed in claim 4, wherein said receptacle includes a spring biasing member engaged between said second spindle and said receptacle for winding said shielding device onto said second spindle and for moving said shielding device relative to said attracting device.

6. The magnetic holding device as claimed in claim 1, wherein said receptacle includes at least one roller supported in said chamber of said receptacle and engaged with said shielding device for tightening said shielding device.

* * * * *